United States Patent [19]
Carr

[11] 3,894,308
[45] July 15, 1975

[54] VACUUM CLEANER NOZZLE
[75] Inventor: Keith E. Carr, Stevensville, Mich.
[73] Assignee: Whirlpool Corporation, Benton Harbor, Mich.
[22] Filed: Feb. 14, 1974
[21] Appl. No.: 442,316

Related U.S. Application Data

[63] Continuation-in-part of Ser. No. 273,023, July 18, 1972, Pat. No. 3,815,171.

[52] U.S. Cl. .................... 15/369; 15/397; 15/402
[51] Int. Cl.² .......................................... A47L 9/02
[58] Field of Search ............ 15/369, 373, 397, 402, 15/415, 416

[56]  References Cited
UNITED STATES PATENTS

| | | | |
|---|---|---|---|
| 2,276,886 | 3/1942 | Smith | 15/397 UX |
| 3,308,500 | 3/1967 | Woodruff | 15/369 |
| 3,611,473 | 10/1971 | Johnson | 15/402 |
| 3,633,241 | 1/1972 | Schmitz | 15/369 X |
| 3,668,735 | 6/1972 | Dupea | 15/402 X |

Primary Examiner—Edward L. Roberts
Attorney, Agent, or Firm—Wegner, Stellman, McCord, Wiles & Wood

[57] ABSTRACT

A vacuum cleaner nozzle movable over a deep pile rug and the like having a body with a suction chamber portion and a retractable pivotable rake with hollow tines providing air flow passages when the rake is extended and pulled through the pile in order to exert a suction cleaning effect down to the bottom of the pile. The nozzle may also include a narrow rear wall portion on each tine with diverging sides toward a front wall portion so that the tines of the rake thereby act as pile-penetrating plows when the nozzle is pulled across deep pile rugs. The disclosure also includes a releasable retainer for retaining the rake in a retracted position as for surface cleaning and a movable cam for urging the rake from its retracted position toward an automatic operating position for cleaning a deep pile rug. In the automatic operating position, the tines of the rake automatically pivot backward as the nozzle is pushed forward, and pivot to an extended pile-penetrating position as the nozzle is pulled backward. The disclosure also includes a movable valve in the nozzle body movable by the rake between a first location blocking air flow through the nozzle inlet when the rake is in extended automatic operative position for deep cleaning and grooming of long pile fibers, and movable to a second location blocking the flow of air into and through the hollow tines when the rake is in retracted inoperative position as when the nozzle is used for surface cleaning. In the disclosure herein of another embodiment, a rake with hollow air conducting tines is movably mounted on an elongated hollow body and is movable between a tine-extending, pile-penetrating position and a tine-retracted position for surface cleaning with the rake acting also as a valve for closing the surface cleaning opening when the tines are in the extended position. In still another embodiment of the disclosure, a manual control element is provided for selectively permitting the retractable tines to be retained in a retracted position or be prevented from moving into the retracted position. In yet another embodiment of the invention, the tines are provided with an extension portion which effectively closes the normal suction inlet when the tines are brought to the shag rug cleaning position to assure that all suction air is brought through the hollow tines for improved shag rug cleaning.

33 Claims, 21 Drawing Figures

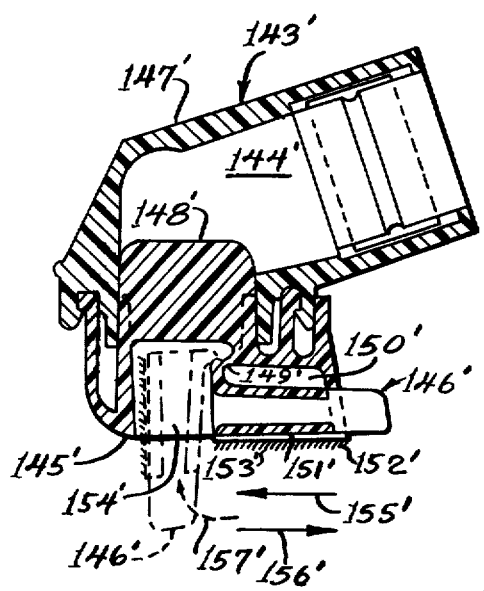
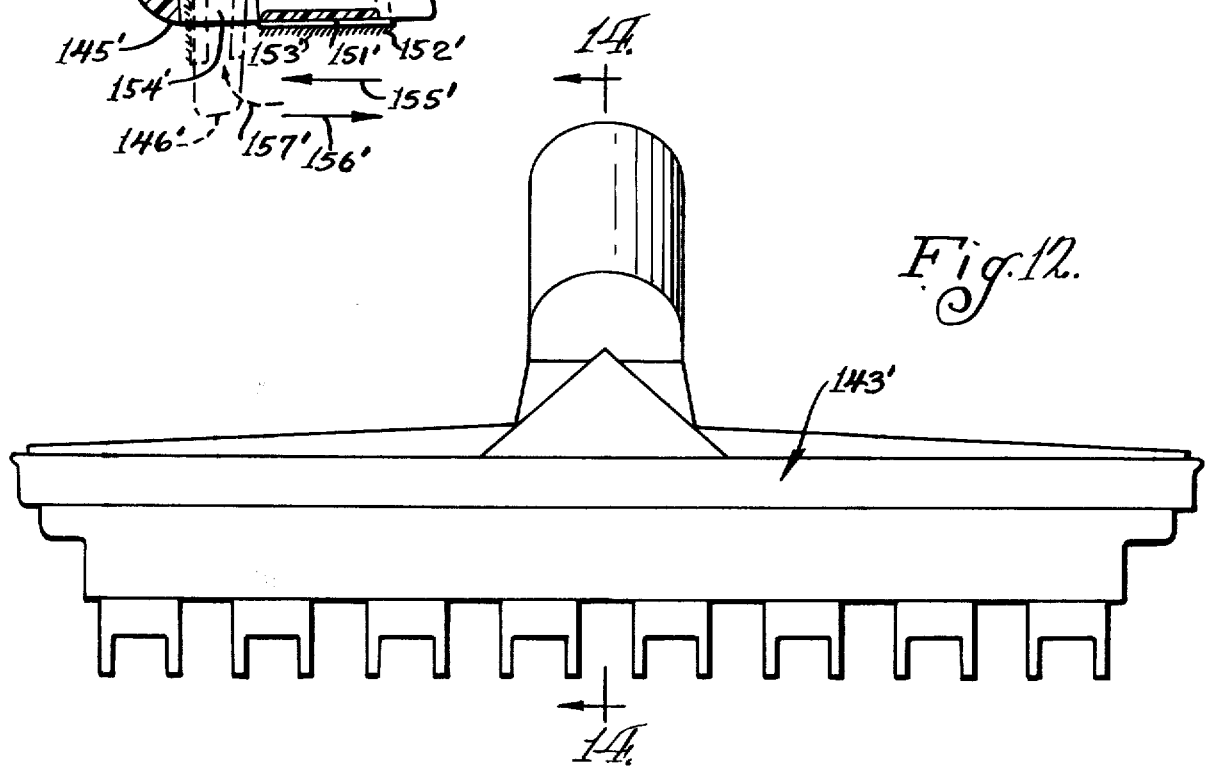
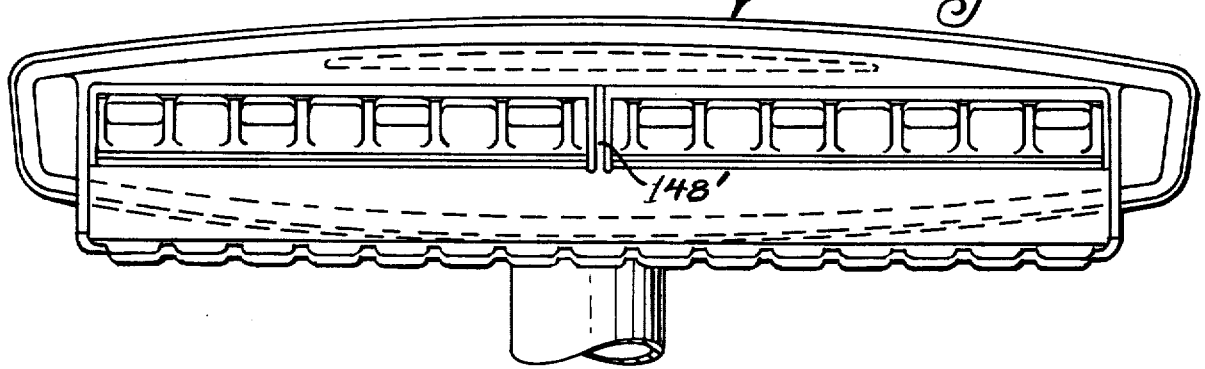

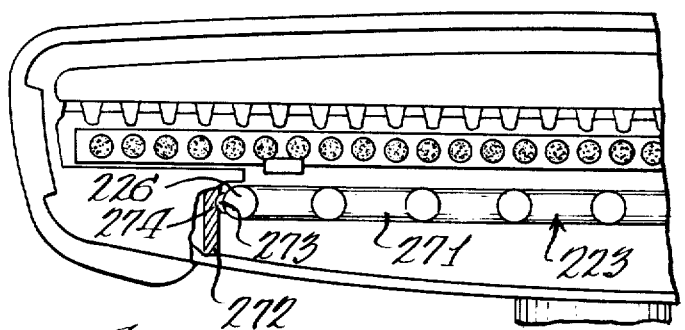
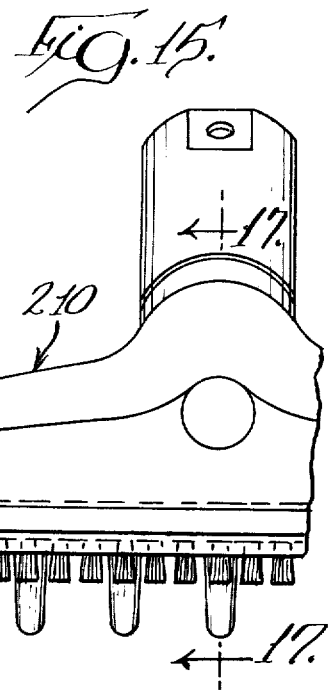
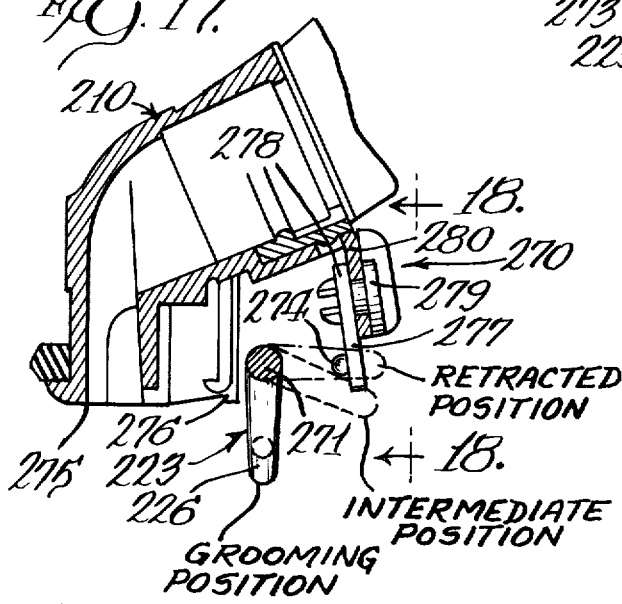
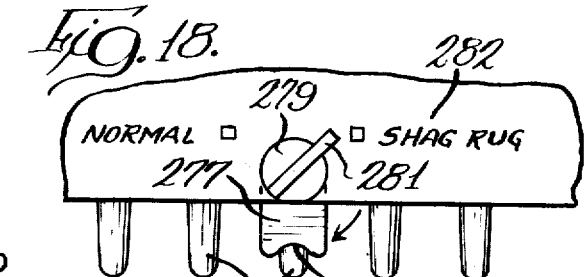
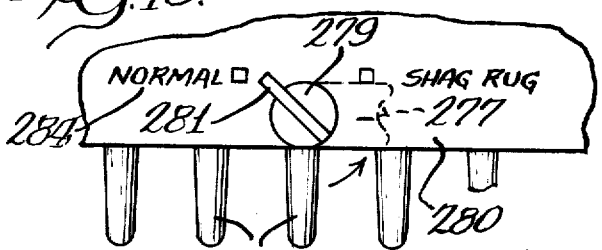
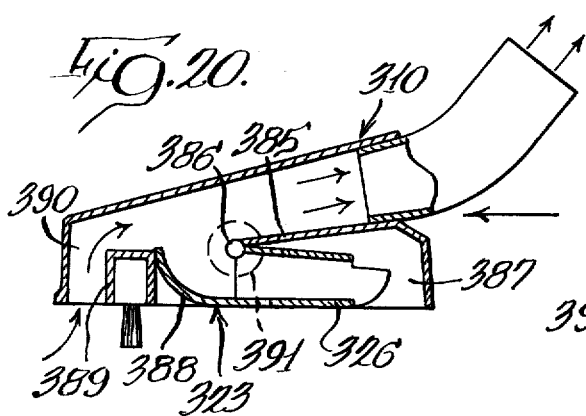
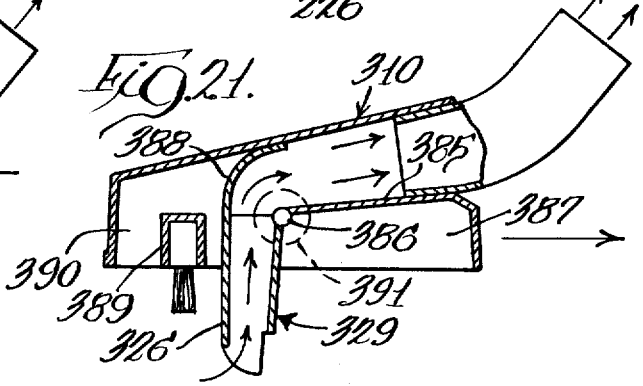

VACUUM CLEANER NOZZLE

CROSS-REFERENCE TO RELATED APPLICATIONS

This application comprises a continuation-in-part of application Ser. No. 273,023, filed July 18, 1972, now U.S. Pat. No. 3,815,171 entitled "Vacuum Cleaner Nozzle."

BACKGROUND OF THE INVENTION

1. Field of the Invention

This invention relates to a vacuum cleaner nozzle apparatus praticularly adapted for cleaning deep pile rugs and having a movable rake with hollow air flow tines movable to inoperative retracted position when the nozzle is used for rug surface cleaning and the like, and movable to projected operative position for penetrating the pile when the nozzle apparatus is pulled across the rug.

2. Description of the Prior Art

A number of different vacuum cleaners have been developed having nozzles arranged for cleaning rugs, including means for adapting the nozzles for use with long pile or shag type rugs. An excellent example of such a vacuum cleaner nozzle structure is disclosed in Joseph F. Schmitz et al. U.S. Letters Pat. No. 3,633,241, owned by the assignee hereof.

Other examples of vacuum cleaner nozzles having rug-engaging elements for loosening foreign matter from the carpeting for facilitated suction thereof through the nozzle are those of W. O. Langille U.S. Letters Pat. Nos. 1,959,167; A. H. Beede 2,511,238; C. E. Meyerhoefer 2,716,773; and H. T. Draudt 2,717,409.

A number of nozzle structures have been developed provided with hollow tines for providing suction at the base of the pile of such carpeting as illustratively disclosed in U.S. Letters Pat. Nos. 3,611,473 of P. O. Johnson and 3,668,735 of Fred W. Dupea.

Additional pertinent suction structures are illustrated in the U.S. Letters Pat. of George A. Smith 2,276,886; R. L. Hallock 2,516,205; O. G. Woodruff 3,308,500; and S. B. Holubinka 3,708,824.

SUMMARY OF THE INVENTION

A feature of the invention is to provide a combination rug tool which can be used for deep cleaning and grooming of long pile rug fibers, and for surface cleaning.

A further feature of the invention is to provide a shag rug cleaning attachment with a rake which can automatically switch from a downwardly extending pile-penetrating position to a rearwardly extending position as the rake is pulled and pushed across a carpet.

Still another feature of the invention is to provide a vacuum cleaner nozzle apparatus with a pivotally movable rake having hollow air flow tines in combination with a movable valve that is movable to block air flow through the nozzle entrance when the tines are in extended operative position and to block the air flow through the tines when the rake is in retracted inoperative position.

A still further feature of the invention is to provide extendable hollow tines that are narrower on a rear edge than a forward edge so that when the tines are pulled through deep pile, each tine acts as a plow to separate and clean between the fibers of the pile.

Yet another feature of the invention is the provision of such a movable rake which extends across the nozzle entrance opening when in the extended position to operate as a valve for closing the nozzle entrance opening and directing substantially all air through the hollow tines without requiring a separate valve.

In still another embodiment disclosed herein, a rake is swingably mounted to the nozzle and selectively retained in a retracted position to permit the tool to be used on low pile carpeting, the control being operable to release the rake and permit it to extend downwardly to provide a combing action in the movement of the nozzle over the carpeting.

The invention further comprehends the provision of a nozzle rake structure utilizing a rake swingably mounted to the underside of the nozzle and selectively retained in a retracted position by a manually operable selector control to permit the nozzle to be used on low pile carpeting. Manual operation of the selector control to release the rake permits the rake to extend downwardly and swing back and forth as the nozzle is moved forwardly and rearwardly in the normal vacuum cleaning operation, thereby providing further control of the suction action of the nozzle as a function of the direction of manipulation of the nozzle when the rake is released from the retracted position.

BRIEF DESCRIPTION OF THE DRAWINGS

Other features and advantages of the invention will be apparent from the following description taken in connection with the accompanying drawing wherein:

FIG. 12 is a front elevational view of still another form of suction nozzle embodying the invention;

FIG. 13 is a bottom view of the embodiment of FIG. 12;

FIG. 14 is a sectional view taken substantially along the line 14—14 of FIG. 12;

FIG. 15 is a fragmentary front elevation of yet another modified form of suction nozzle embodying the invention;

FIG. 16 is a fragmentary bottom plan view thereof with portions broken away to facilitate illustration of the construction of the nozzle;

FIG. 17 is a section taken substantially along the line 17—17 of FIG. 15;

FIG. 18 is a fragmentary rear elevational view taken from the line 18—18 of FIG. 17 and with the manual control element in the "Shag Rug" cleaning position;

FIG. 19 is a view similar to that of FIG. 18, but with the manual control in the "Normal" position;

FIG. 20 is a fragmentary vertical section of another form of suction nozzle embodying the invention with the rake in the retracted position; and FIG. 21 is a view similar to that of FIG. 20 but with the rake in an extended "Shag Rug" cleaning position.

DESCRIPTION OF THE PREFERRED EMBODIMENTS

Figure 1:
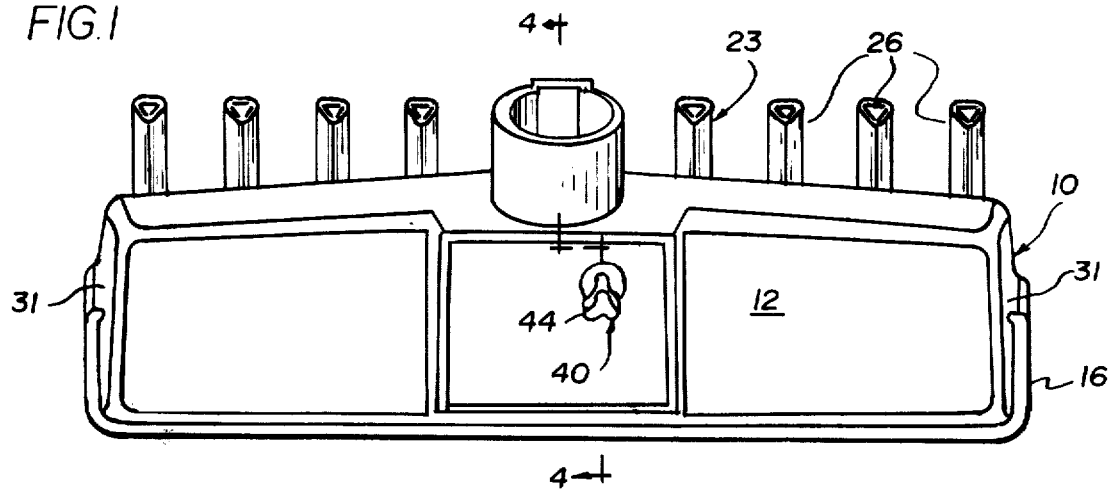
FIG. 1 is a plan view of a vacuum cleaner nozzle apparatus embodying the invention.
Figure 2:
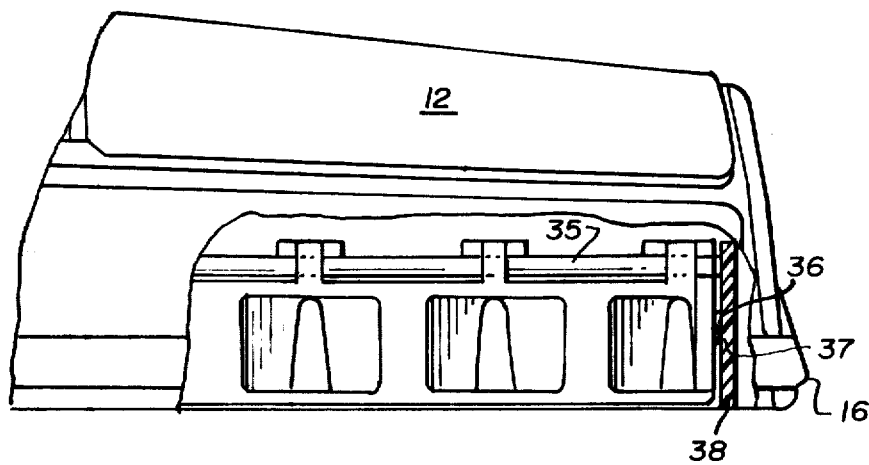
FIG. 2 is a fragmentary front elevational view of the apparatus showing one end thereof and broken away and in section substantially along line 2—2 of FIG. 5.

In FIGS. 1–5 of the drawings, there is illustrated one embodiment of a vacuum cleaner nozzle apparatus 10 movable over a deep pile rug 11 and the like during cleaning with the apparatus comprising a hollow body 12 with a suction chamber portion 13 therein adapted to be subjected to vacuum when attached at the neck 14 to a customary canister-type vacuum cleaner through a tubular wand and flexible hose (not shown).

Figure 5:
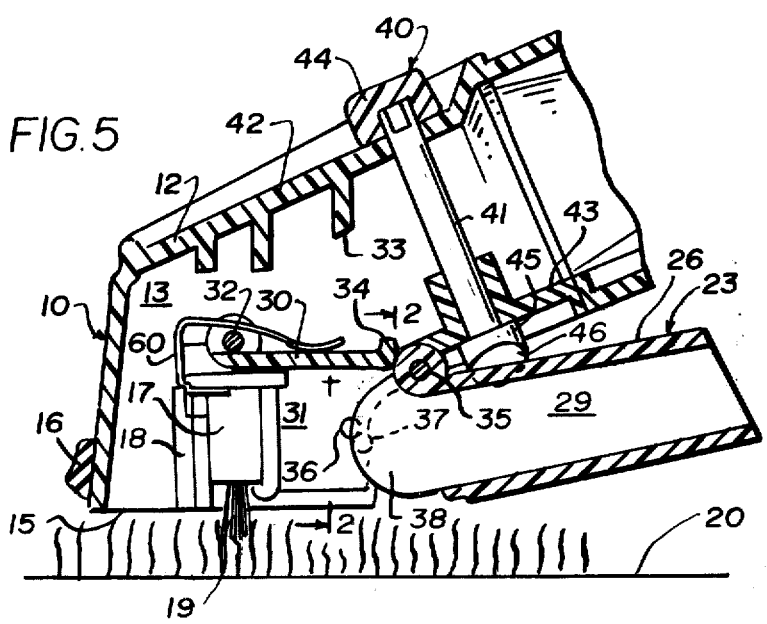
FIG. 5 is a view similar to FIG. 4 but showing the rake in fully retracted position.

The body 12 has a lower entrance end 15 through which air is drawn by the suction during surface cleaning as shown in FIG. 5. This entrance end 15 is surrounded by a customary resilient bumper strip 16.

Extending transversely of the nozzle body 12 is a customary brush unit 17 retained in a housing 18 so that the linearly aligned rows of bristles 19 may project below the entrance end 15 and aid in the cleaning of the rug or carpet 20 in the customary manner.

In order to provide for cleaning between fibers 21 and at the base 22 of the deep pile rug 11, there is provided on the nozzle body 12 a retractable pivotable rake 23 having an upper portion 24 at the vacuum cleaner body 12 and a lower portion 25 comprising a plurality of extended hollow tines 26 for combing through the fibers 21 and cleaning them. In the illustrated embodiment, there are ten substantially evenly spaced tines 26. Each tine 26 has an open lower end 27, open upper end 28 and an air flow passage 29 therebetween for conducting a dirt laden air stream in the customary manner. The passages 29 in the plurality of tines empty into the suction chamber 13 when the comb, or rake 23, is in its extended operative position shown in FIG. 4, wherein the rake 23 automatically pivots about a hinge rod 35 between a downwardly extending pile-penetrating positoin (shown in broken lines in FIG. 4) assumed when the nozzle apparatus is pulled rearwardly for deep cleaning and rearwardly extending intermediate position shown in solid line in FIG. 4, which rearwardly extending position is assumed as the nozzle apparatus is pushed forwardly for surface cleaning. This pull and push, to-and-fro movement of the nozzle apparatus and rake cleans and grooms the long pile shag rug 11.

Figure 4:
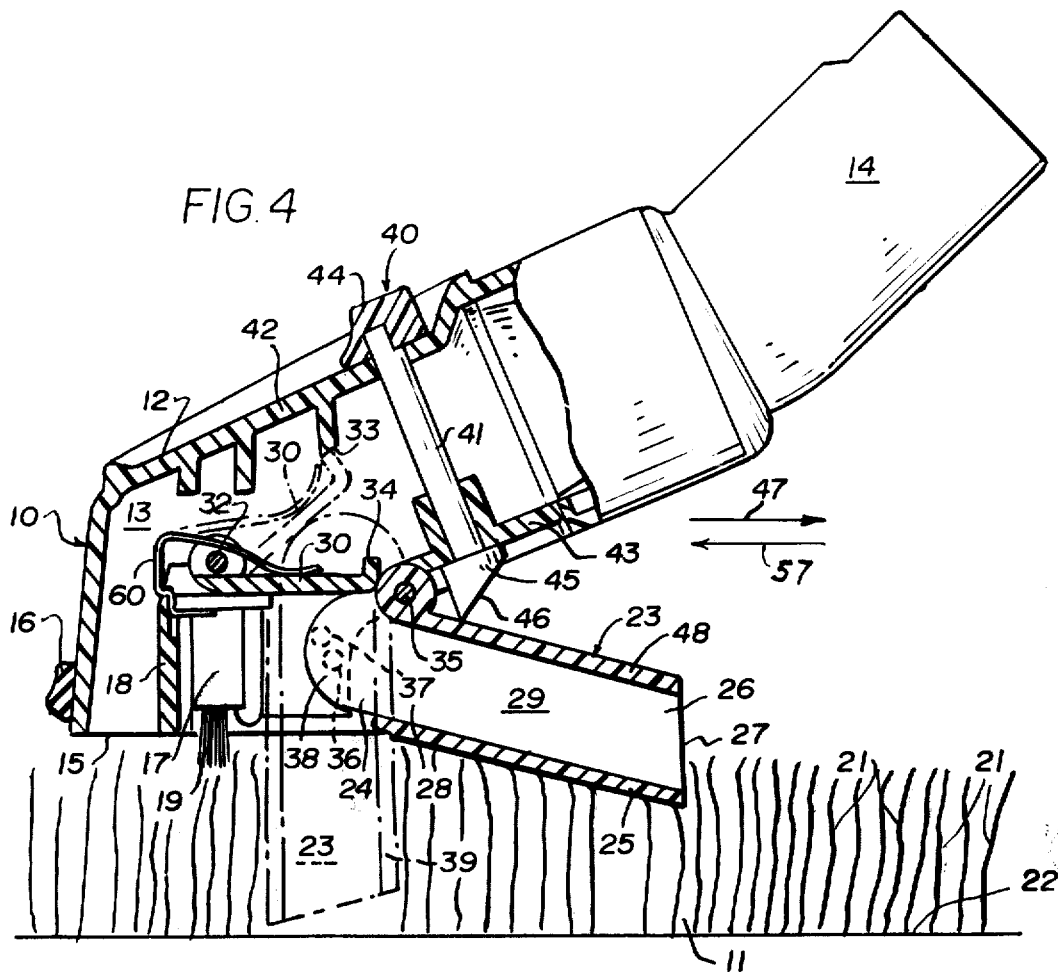
FIG. 4 is a sectional view taken substantially along line 4—4 of FIG. 1.

Mounting means are provided for mounting the rake on the nozzle body 12 for the above described pivotal movement between the above extended opeative positions shown in FIG. 4 wherein the nozzle apparatus 10 is used for cleaning and grooming of deep pile rugs, and a retracted position shown in FIG. 5 wherein the nozzle apparatus 10 is used for surface cleaning and the rake portion thereof is inoperative.

In order to control air flow through the hollow tine passages 29, there is provided an elongated flap valve 30 extending substantially the full length of the nozzle body 12 between the ends 31 thereof. This flap valve 30 is hingedly mounted at one edge to a hinge rod 32 that also extends horizontally between the ends 31 of the nozzle body. The valve is movable about its rod 32 between a first location, shown in broken lines in FIG. 4, blocking the entrance end 15 or nozzle inlet when the rake is in its broken line extended position of FIG. 4 for deep cleaning, and a second location, as shown in solid lines in FIGS. 4 and 5, where it blocks the flow of air into and through the passages 29 in the hollow tines 26 when the rake 23 is in either its intermediate position or its retracted inoperative position. When this occurs, the air is freely drawn through the suction inlet or entrance end 15 for effective surface cleaning while no air is drawn under suction through the tine passages 29.

Figure 3:
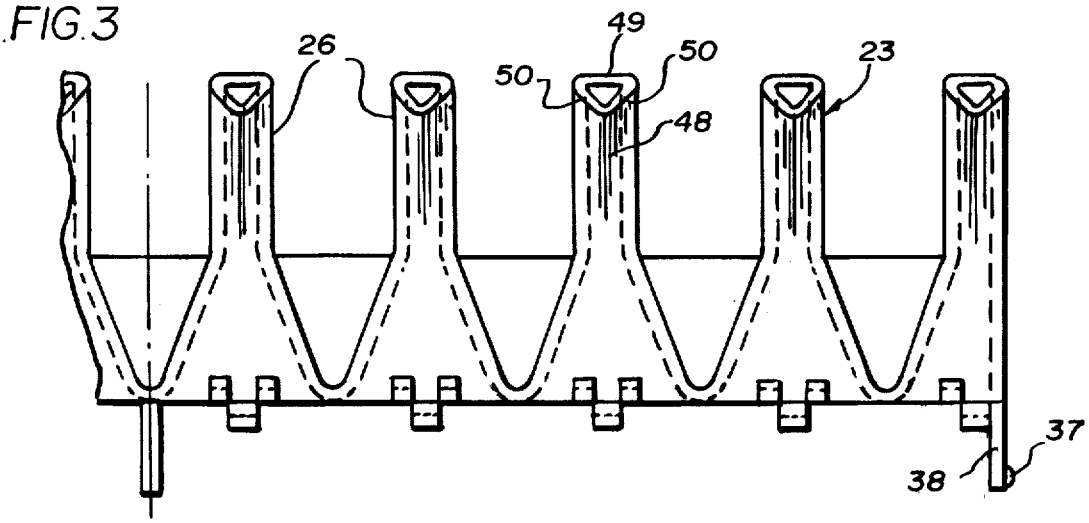
FIG. 3 is a fragmentary rear side elevational view of the rake only.

The rake 23 is provided with end flanges 38 which are shaped and positioned to move the flap valve 30 to the desired position (see FIGS. 3, 4 and 5). The curved cam shape of each end flange 38 as it may contact the lower surface of flap valve 30 determines the position of the flap valve 30 at any angle of the rake from the position shown in broken line in FIG. 4 to the retracted position shown in FIG. 5. End flange 38 is shaped to provide no movement of the flap valve 30 as the rake is moved from the position shown in FIG. 5 to the position shown in solid line in FIG. 4. As the rake is moved toward the position shown in broken lines in FIG. 4, the curved cam shape of end flange 38 provides a rapid rise of flap valve 30 such that the flap valve seats against an integral valve seat 33 formed in body 12 (FIG. 4) before the rake reaches the position shown in broken line in FIG. 4. A resilient spring 50 (FIGS. 4 and 5) is utilized to provide positive contact between flap valve 30 and end flange 38 during movement of the flap valve, and for positive seating of flap valve 30 against an integral valve seat 34 formed in body 12 (FIGS. 4 and 5).

As indicated above, the nozzle body 12 is provided with a pair of integral valve seats 33 and 34 which are engaged by the movable flap valve 30 in its two above described extreme positions. Adjacent the valve seat 34, which is engaged by the valve 30, as shown in FIGS. 4 and 5, when the rake 23 is in its intermediate position or its inoperative position, is a second transverse hinge rod 35 which comprises the mounting means for the rake 23 for pivotal movement between its two positions as previously described.

In order to retain the rake 23 in fully retracted position, as shown in FIG. 5, there are provided releasable retaining means. In the illustrated embodiment, this retaining means comprises a projection or elevation 36 on the inner surface of each end wall 31 of the nozzle and a similar projection or elevation 37 on each end flange 38 of the rake 23 (see FIGS. 2 and 3). When the rake is in retracted position, as shown in FIG. 5, the end wall elevation 36 is above and in engagement with the similar elevation 37 on the rake. These engagements of the two pairs of elevations serve to retain the rake resiliently and releasably in retracted position. Downward movement on the rake 23 from the position shown in FIG. 5 to the positions shown in FIG. 4 serves to displace the resilient end flanges 38 of the rake and permit movement of the to its automatically pivotable positions shown in FIG. 4 for deep pile cleaning as previously described.

In order to aid this displacement, there is provided a rotatable cam member 40 comprising a shaft 41 extending through the top 42 and bottom 43 of the nozzle body 12 provided on its upper end with a knob 44 accessible for turning the rod 41 about its longitudinal axis and a bottom end 45 having an inclined cam surface 46 thereon.

As shown in FIG. 5, when the cam member 40 is turned to one position, the inclined cam surface 46 is adjacent and against a tine 26 of the rake 23. When the cam member is rotated approximately 180°, the inclined cam surface 46 presses downwardly against the tine at an area adjacent the hinge rod 35 to move the rake 23 from the position of FIG. 5 to the position of FIG. 4 during which the elevations 36 and 37 are snapped past each other so that the rake is free to rotate to its fully extended operative pile-penetrating position 39 when the nozzle is pulled rearwardly across the deep pile rug 11 in the direction indicated by the arrow 47 of FIG. 4, and pivot between position 39 shown in broken lines in FIG. 4, and the rearwardly extending position shown in solid lines in FIG. 4, when the nozzle is pushed forwardly across the deep pile rug 11 in the direction indicated by the arrow 57 of FIG. 4. This causes the tines of the rake to be fully extended on the pulling stroke for complete deep penetration and thorough cleaning of the fibers 21 and the base 22 of the rug and causes the tines to be pivoted rearwardly to the position shown in solid lines in FIG. 4 on the pushing stroke for surface cleaning of the rug fibers.

In the illustrated embodiment of FIGS. 1–5, the rear wall 48 of each tine 26 is relatively narrow while the front wall 49 is wider and the two are connected by diverging side walls 50 with the result that the narrow rear wall 48 in combination with the diverging sides 50 causes each tine to function as a plow in moving through and between the fibers 21 thereby aiding in the cleaning operation.

Figure 9:
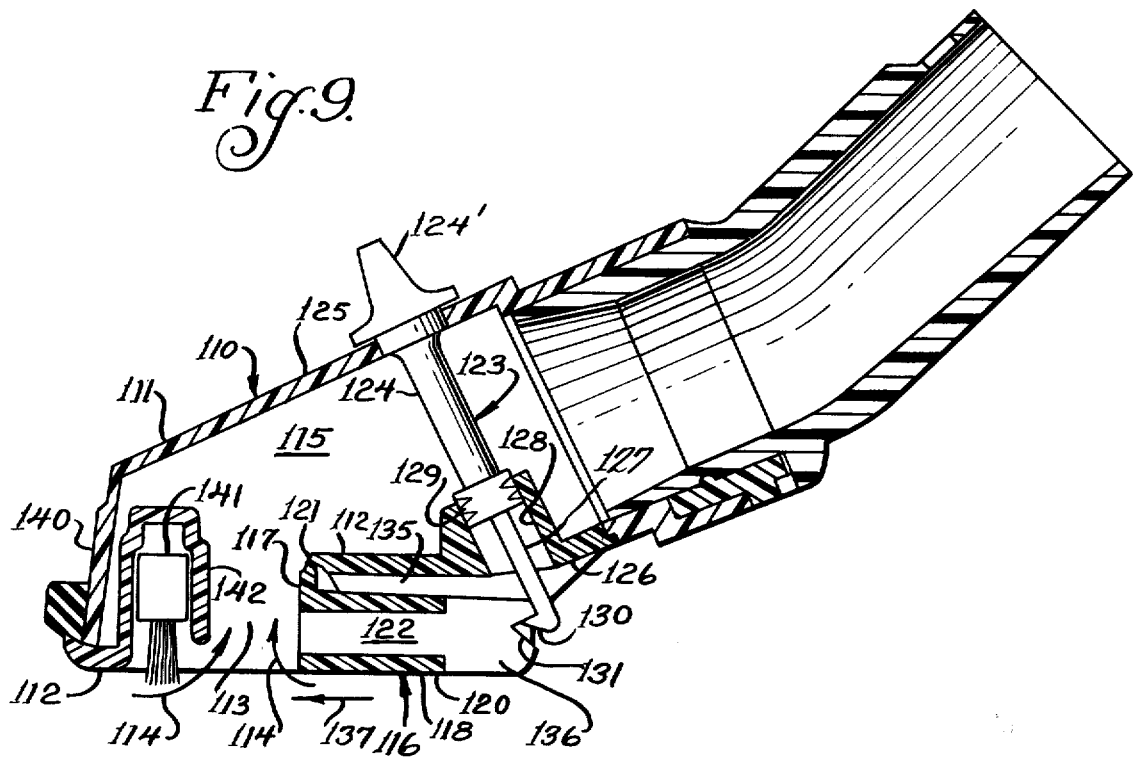
FIG. 9 is a view similar to FIG. 8 but showing the rake tines in retracted position.

In the embodiment of FIGS. 6–9, a suction nozzle 110 comprises an elongated hollow body 11 having a fabric contacting bottom wall 112 with an opening 113 for flow of air 114 into the hollow interior 115 of the nozzle body during ordinary surface cleaning when the parts are arranged in the position shown in FIG. 9.

Figure 6:
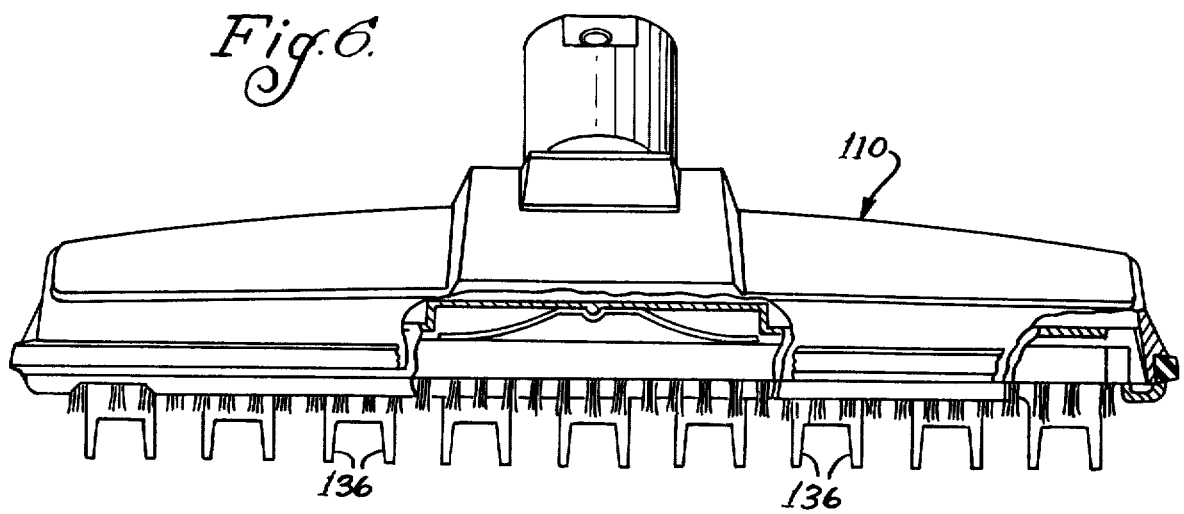
FIG. 6 is a front elevation of a modified form of suction nozzle embodying the invention, with portions broken away.
Figure 7:
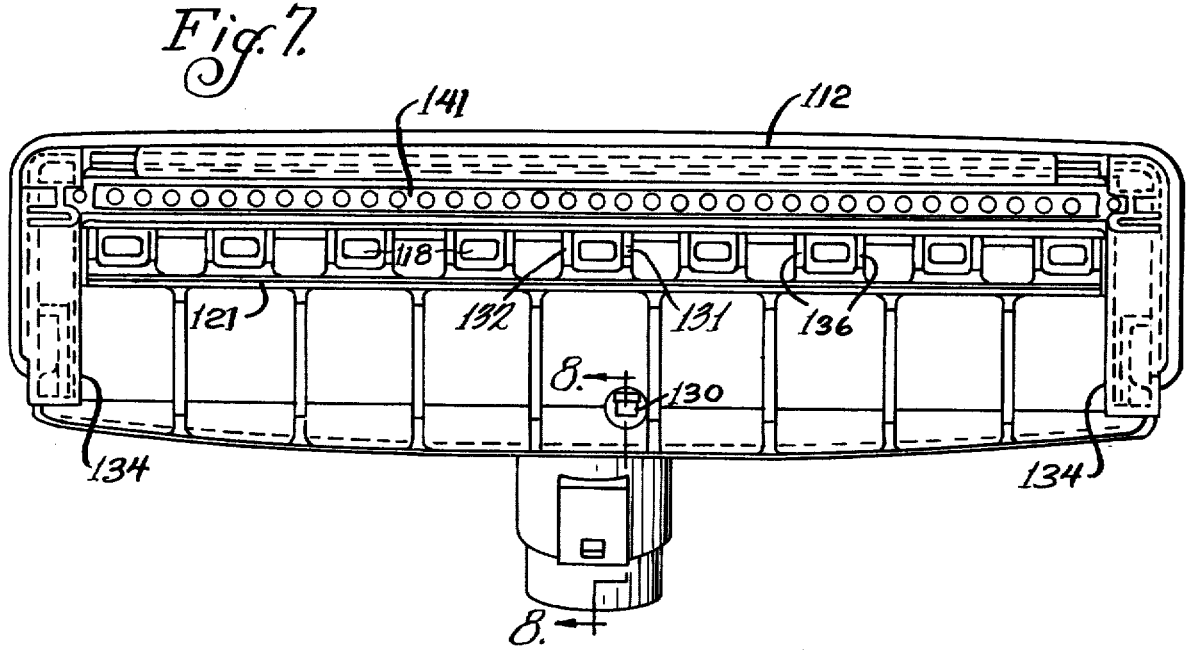
FIG. 7 is a bottom view of the embodiment of FIG. 6.
Figure 8:
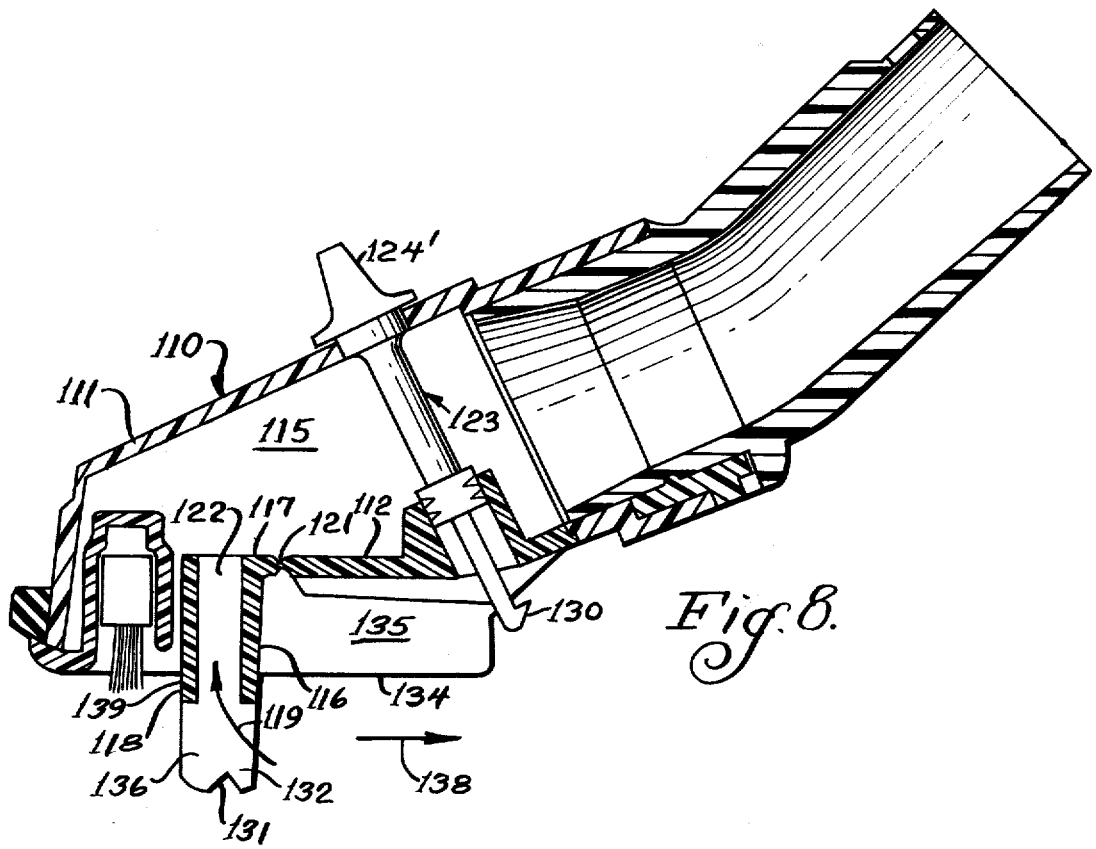
FIG. 8 is a sectional view taken substantially along line 8—8 of FIG. 7.

The bottom wall 112 is provided with a rake 116 at the bottom thereof adjacent the suction opening 113 with the rake comprising a back 117 and a hollow spaced tines 118 extending from the back 117 for flow of air 119 through each tine 118 upwardly into the hollow interior 115 when the tines 118 are in their extended pile-penetrating positions, as illustrated in FIGS. 6–8.

The rake 116 is provided with pivot means adjacent the air suction opening 113 for mounting the rake on bottom wall 12 for pivotal movement between the tine-extended position of FIGS. 6–8 for penetrating the pile (not shown) and time-retracted position as shown in FIG. 9 for ordinary surface cleaning where the coplanar bottom surfaces 120 of the tines are arranged substantially in the same plane as the bottom surface of the bottom wall 112.

The pivot means in the illustrated embodiment of FIGS. 6–9 is an integral section 121 of the material making up the nozzle body which, in one embodiment, is solid polypropylene. As is illustrated in FIGS. 8 and 9, this integral pivot section 121 is of reduced thickness for added flexibility.

As is shown in FIG. 8, when the rake 116 is in the tine-extended position, it extends substantially across the air suction opening 113 to serve simultaneously as a valve for closing this opening 113 and directing substantially all air flow 119 up through the hollow interiors 122 of the tines which, for this purpose, are open at the top and bottom of each tine.

In this embodiment, there are provided movable catch means 123 for retaining the rake in the retracted position of FIG. 9. In this embodiment, the catch 123 comprises an axially rotatable shaft 124 extending between the top wall 125 and the bottom 126 of the nozzle 110 with the upper end of this shaft 124 provided with a hand engageable knob 124' by means of which the shaft can be rotated.

The lower end of the shaft is reduced as shown at 127 and extends through a cylindrical opening 128 to which the shaft is sealed as by means of a flexible seal 129. The lower end of this reduced portion 127 is shaped as a hook 130 to engage a notch 131 at the bottom end of an intermediate tine 132.

In this embodiment, end wall sections 134 of bottom wall 112 define a chamber 135 into which the tines 118 of the rake are received when the rake is in its retracted position of FIG. 9.

The individual tines 118 each comprise side wall sections 136 that are substantially parallel to each other, as shown in FIG. 7, and that are substantially parallel to the directions 137 and 138 of movement of the nozzle 110. These side walls extend downwardly below the tubular portion 139 of the respective tines 118 so as to provide spaced pile-penetrating members that are thin in the direction of movement of the nozzle so as to aid the penetration of the pile fabric and dislodgement of dirt trapped therein as well as facilitate grooming of the shag carpet pile.

In this embodiment, the nozzle 110, in the section adjacent its front wall 140, is provided with a fabric agitating member 141 in the form of a transverse brush located in an integral hollow chamber portion 142 that is adjacent to the front wall 140.

When the rack 116 is locked in the retracted position, as shown in FIG. 9, by engagement of the hook 130 with the notch 131, the nozzle can be propelled across the surface being cleaned in the normal manner, and the nozzle rides on the coplanar surfaces 112 and 120. In this normal surface cleaning operation, the nozzle functions in the normal manner with the air streams 114 being drawn into the hollow interior 115 through the air flow opening 113.

When the nozzle is to be used on shag pile carpet fibers, the rake is released as by turning the catch 123 to the opposite position of FIG. 8 and the rake then functions on rearward movement 138 of the nozzle 110 to extend the tines 118 into pile-penetrating position wherein the tines, and particularly the flat narrow sides 136 thereof, penetrate the pile so that it is easier to loosen the dirt from the deep pile as well as groom the capet fibers, whereupon the dirt is carried with the air flow 119 through the hollow tubular portion 129 of the tines into the hollow interior 115. As stated earlier, when the rake is in this extended position, the rake, and particularly the back 117 thereof, functions as a valve to close the air suction opening 113 with the result that substantially all air flow is through the tubular interiors 122 of the tines.

Figure 11:
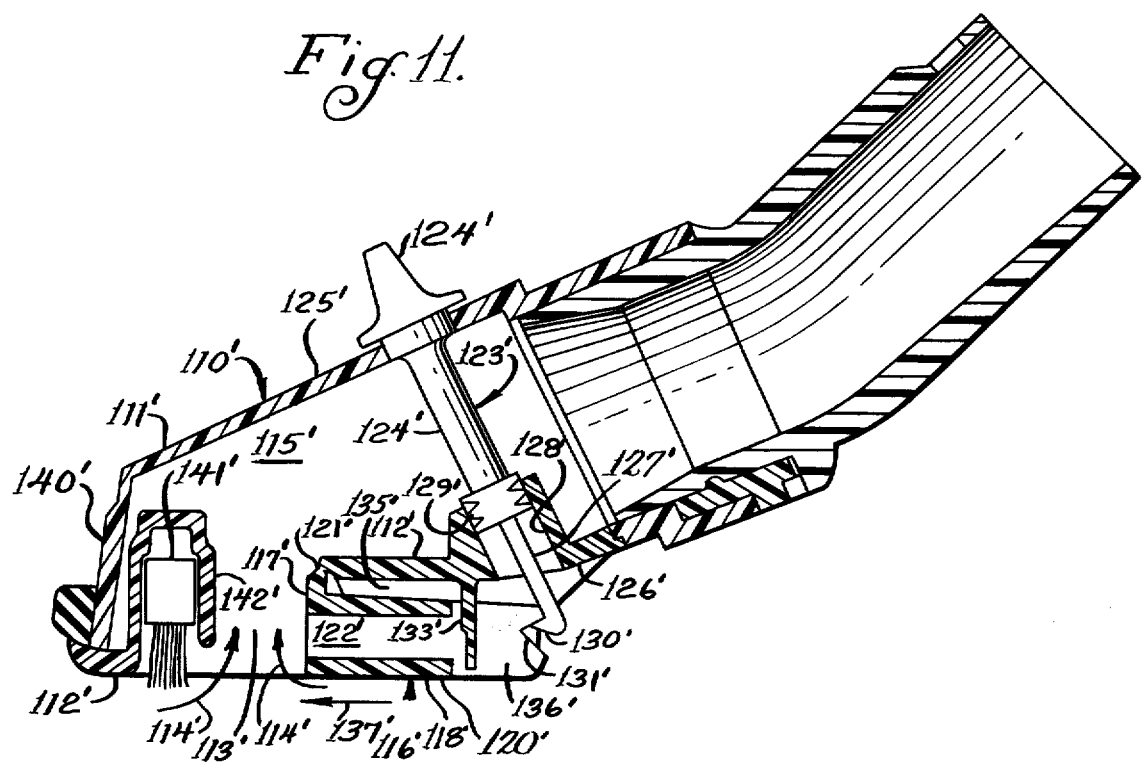
FIG. 11 is a vertical section taken substantially along the line 11—11 of FIG. 10.
Figure 10:
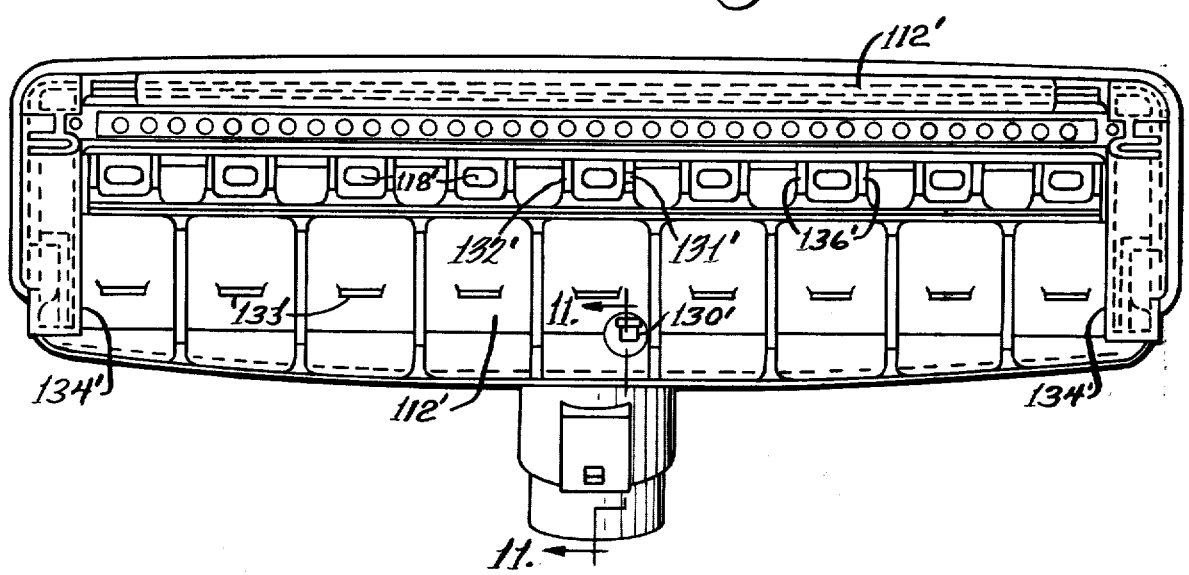
FIG. 10 is a bottom view of still another form of suction nozzle embodying the invention.

In the embodiment of FIGS. 10 and 11, the nozzle 110' is substantially the same as the nozzle of the first embodiment having a hollow interior 115' and a bottom wall 112' including a rake 116' which may be made of synthetic plastic. In this embodiment, there are provided closure means for blocking the tubular tines 118' when the rake is in the retracted position, as shown in FIG. 11, so that there will be substantially no air flow through the hollow interiors of the tines. In this embodiment, this closure means comprises rear wall sections 133' integral with the bottom wall 112' which substantially close interiors 122' of tines 118'.

In the embodiment of FIGS. 12–14, the nozzle 143' also has a hollow interior 144' and the nozzle, as well as the floor-contacting unit 145' and rake 146', may be made of a synthetic plastic such as in the embodiment of FIGS. 6–9, namely, solid polypropylene. In this embodiment, the floor unit 145' is snapped into position on the bottom of the nozzle body 147' and the unit carries a central rib 148' extending up into the body 147' at the hollow interior.

In the embodiment of FIGS. 12–14, the rake 146' is also pivoted for movement between the retracted position of FIG. 14 and the extended position shown in broken lines in FIG. 14 and full lines in FIG. 12. This rake, like the one of the embodiment of FIGS. 6–9, is provided with pivot means in the form of a thin integral section 149' and when retracted, is received within a hollow chamber 150' in the bottom of the floor-contacting unit 145'. In this embodiment, the fabric agitating member 141' is omitted and in its place, there is provided on the bottom surface 151' of the rake, when in retracted position, a synthetic fabric 152', a typical one of which is identified as "Fibre-Tran," which is a registered trademark. This material is a synthetic short pile fabric of extended, oriented, semirigid fibers 153' that are oriented to extend at an angle toward the air suction opening 154'.

In this embodiment, when the nozzle 143' is moved forwardly, as indicated by the arrow 155', not only is the rake 146' pivoted to the retracted position shown in solid lines in FIG. 14, but the oriented angled fibers 153' of the fabric 152' serve to pick up lint and other foreign material on the rug for later removal by suction.

Then, when the nozzle 143' is moved rearwardly as indicated by the arrow 156', not only are the pieces of lint and the like on the fibers 153' dislodged to be drawn in by the suction air flow 157', but the rake 146' is automatically moved to extended position, as shown in broken lines in FIG. 14 and in solid lines in FIG. 12. Otherwise the operation of this embodiment is substantially the same as the operation of the nozzle of the embodiment of FIGS. 6–9. If desired, a catch, like catch 123 of the embodiment of FIGS. 6–9, may be provided to selectively retain the rake 146'.

The suction nozzle provides for surface cleaning of a rug or the like and also for deep pile cleaning of shag rugs and similar floor coverings in the use of a movable rake with hollow air flow tines for deep pile suction of air and entrapped solids therethrough with the rake also functioning as a valve to close the surface cleaning air passage in the nozzle when the rake has been moved into deep pile cleaning position.

An important feature of the nozzles of FIGS. 6–14 is the provision of the extended sides 136 and 136' on each tine 118 and 118'. These sides, which are parallel to each other, parallel to the direction of normal movement of the nozzle, and thin in cross section at right angles to the nozzle, not only aid the penetration of the fibers of the deep pile and the resultant loosening of dirt trapped therein and facilitate grooming of shag carpet fibers, but also aid in the easy movement of the tines through the pile, and by having the bottom, front and rear sides of each tine open for a substantial distance, as can be seen in the embodiment of FIG. 8, provides for freer and higher volumetric air flow 119 with the same degree of suction through the hollow interior 115 of the nozzle. This increased linear rate of air flow, of course, increases the rate of removal of dirt from the rug and also results in more dirt being removed in a single movement 138 of the nozzle.

Referring to the embodiment of the invention illustrated in FIGS. 15–19, a suction nozzle generally designated 210 is shown to comprise a suction nozzle generally similar to suction nozzle 10, but having a retractable pivotable rake 223, the positioning of which is selectively controlled by a manually operable control generally designated 270. The rake 223 defines a grooming tool having a plurality of tines 226 carried on a pivot bar 271. The pivot bar is pivotably carried in end plate brackets 272 of the nozzle to permit swinging of the tines 226 between a downwardly extending grooming position, as shown in full lines in FIGS. 15 and 17, and an upper retracted position shown in broken lines in FIG. 17.

The rake is retained in the retracted position by cooperating projection elements 273 on the end tines and complementary recess portions 274 on the mounting brackets 272. Thus, when the rake is extended in the retracted position, nozzle 210 functions in the normal manner with the inlet 275 being disposed closely adjacent the surface being cleaned.

In the grooming operation of the nozzle, the nozzle extends downwardly, as shown in FIG. 17. With the nozzle being drawn rearwardly, the swingable rake is prevented from swinging substantially beyond the downwardly extending operative position by a forward stop 276 and, thus, functions to groom the shag rug fibers. When the nozzle is urged forwardly, the rake swings about the axis of rod portion 271 back to the intermediate position wherein the nozzle inlet 275 is disposed adjacent the lower portion of the fibers so as to provide a vacuum suction action thereat. Thus, an improved cleaning of the shag rug fibers with the suction action occurring both at the top of the fibers when the nozzle is drawn rearwardly and adjacent the lower portion of the fibers when the nozzle is moved forwardly, is effected by means of nozzle 210.

The rake is prevented from moving fully to the retracted position when the nozzle is urged forwardly by the control 270, which includes a movable stop member 277 secured to the shaft 278 of a control knob 279 rotatably mounted in a rear wall portion 280 of the nozzle, as best seen in FIG. 17. As shown in FIG. 18, when the control knob is manually rotated to dispose an indicator portion 281 thereof in line with a "Shag Rug" indicium 282 on nozzle wall portion 280, the stop member 277 extends downwardly to dispose a recessed lower edge 283 in the upward path of movement of a rake tine 226 to prevent further upward movement of the rake limiting the rearward swinging thereof to the intermediate position of FIG. 17.

When, however, the nozzle is to be used in the normal manner, as for cleaning conventional relatively short fiber carpeting, control knob 279 is manipulated to bring the indicator portion 281 in line with a "Normal" indicium 284 on wall portion 280 whereby the movable stop member 277 is swung upwardly behind wall portion 280 permitting the user to swing the rake 223 fully to the retracted position of FIG. 17. In this position, the rake is releasably retained by means of the cooperating projection elements 273 on the outboard rake tines and the recesses 274 in the end plate brackets 272. To restore the rake to the "Shag Rug" grooming position, the user need merely turn the control knob 279 to the position of FIG. 18, whereby the movable stop member 277 urges the rake downwardly to withdraw the projection elements 273 from the recess 274 and permit maintained grooming operation by disposition of the movable stop member 277 in the downwardly extending position of FIG. 18, as discussed above.

Turning now to the embodiments of FIGS. 20 and 21, a further modified form of vacuum cleaner nozzle generally designated 310 is shown to comprise a nozzle similar to nozzle 10, but having a rake 323 provided with hollow tines 326 which are swingably connected to a bottom wall portion 385 of the nozzle by a suitable pivot 386. In the retracted position of FIG. 20, the rake tines are received in a downwardly opening recess 387 at the rear portion of the nozzle. In this position, a front portion 388 of the rake engages a brush holder 389 disposed rearwardly adjacent the front nozzle opening 390 of the nozzle.

In the automatic operation of the nozzle, when the nozzle is drawn rearwardly, as seen in FIG. 21, the rake drops down from the recesses 387 to a downwardly extending position wherein the front portion 388 of the rake blocks the front inlet 390 of the nozzle and causes substantially all suction air to be drawn through the hollow tines 326 for improved deep cleaning of the shag rug fibers. If desired, a suitable manual control knob 391 may be provided for selectively locking the rake in the retracted position of FIG. 20, or the extended position of FIG. 21, or permit the rake to swing back and forth between these positions, depending on the direction of movement of the nozzle over the floor surface.

I have shown and described a substantial number of different illustrative embodiments of my invention. As brought out above, the different embodiments provide for facilitated selective cleaning of normal, relatively short fiber carpeting, or relatively long fiber shag type carpeting. In providing this improved operation, I provide a swingable rake means and suitable controls for selectively locking or permitting swinging movement of the rake between the desired positions. The rake provides a grooming function in the extended position, and may further provide improved deep cleaning by the provision thereof with hollow tines. In the hollow tine construction, I further provide means for selectively blocking the normal suction inlet of the nozzle for improved deep cleaning suction action, and more specifically provide the flow blocking means as an integral portion of the rake. As further brought out above, I provide an improved tine configuration for facilitated cleaning and grooming operations.

Having described my invention as related to the embodiments shown in the accompanying drawings, it is my intention that the invention be not limited by any of the details of description, unless otherwise specified, but rather, be construed broadly within its spirit and scope as set out in the appended claims.

I claim:

1. A vacuum cleaner nozzle apparatus movable over a deep pile rug and the like during cleaning, comprising:
   a body having a suction chamber portion adapted to be subjected to vacuum, and a suction inlet;
   a retractable rake having an upper portion at said body and a lower portion comprising a plurality of extended hollow tines for combing said rug, each tine having a lower end, an upper end and a passage therebetween for flow of air into and through said tines into said chamber;
   hinged attaching means for attaching the rake to said body for arcuate movement between an extended operative position and a retracted inoperative position; and
   retaining means for retaining said rake in said retracted position.

2. The apparatus of claim 1 wherein said retaining means comprises yieldable engaged members on said body and said rake that are in engagement when said rake is in the retracted position to maintain the retracted position and with means for forcibly displacing the retracted rake toward the extended position thereby displacing said members from their engagement.

3. The apparatus of claim 2 wherein said displacing means comprises a rotatable cam member on said nozzle body rotatable to urge said rake from said retracted position.

4. A vacuum cleaner nozzle apparatus movable over a deep pile rug and the like during cleaning, comprising:
   a body having a suction chamber portion adapted to be subjected to vacuum, and a suction inlet;
   a pivotable rake having an upper portion at said body and a lower portion comprising a plurality of extended hollow tines for combing said rug, each tine having a lower end, an upper end and a passage therebetween for flow of air into and through said tines into said chamber; and
   mounting means for mounting said rake on said nozzle body for pivotal movement between an extended operation position for deep cleaning of long pile rug fibers and a retracted position for surface cleaning.

5. The apparatus of claim 4 wherein said rake when in said extended operative position pivots automatically between a downwardly extending pile-penetrating position assumed when the nozzle apparatus is pulled rearwardly, and a rearwardly extending position assumed when the nozzle apparatus is pushed forwardly.

6. The apparatus of claim 4 wherein there are provided releasable retaining means for retaining said rake in said retracted position 7. The apparatus of claim 6 wherein said retaining means comprises yieldable projecting members on said body and said rake that are in engagement when said rake is in the retracted position to maintain the retracted position and with means for forcibly displacing the retracted rake toward extended position thereby displacing said members from their engagement.

8. The apparatus of claim 7 wherein said displacing means comprises a rotatable cam member on said nozzle body rotatable to urge said rake from said retracted position.

9. A vacuum cleaner nozzle for use in cleaning a rug, comprising:

a body defining a suction inlet opening;

a rake having tines, said rake being mounted to said body adjacent said suction inlet to be swingable as an incident of movement of the nozzle over the rug in a first direction to an extended position wherein said rake tines extend downwardly from said body to space said body opening substantially above the lower end of the tines in a high rug cleaning disposition, and to a retracted position as an incident of movement of the nozzle over the rug in an opposite direction wherein said rake tines extend laterally subjacent said body to permit the suction inlet opening to be disposed in a lower rug cleaning disposition; and means for selectively retaining said rake in the retracted position irrespective of the direction of movement of the nozzle over the rug.

10. The vacuum cleaner nozzle of claim 9 further including means for forcibly displacing and maintaining said rake away from said retracted position toward said extended position.

11. A vacuum cleaner nozzle for cleaning rugs and particularly those of thick pile fabrics, comprising:

an elongated hollow body having a fabric contacting bottom wall with an air flow opening for flow of air into said body;

a rake at said bottom adjacent said opening comprising a back and tubular, pile-penetrating hollow tines extending therefrom for flow of air through said tines; and pivot means adjacent said opening for mounting said rake on said body for pivotal movement between tine-extended and tine-retracted positions, said rake extending across said hollow body opening when in said tine-extended position and thereby functioning as a valve substantially to close said opening.

12. The nozzle of claim 11 wherein said pivot means comprises a flexible and integral nozzle portion interconnecting said rake and hollow body.

13. The nozzle of claim 11 wherein there are provided movable catch means on said body for retaining said rake in said retracted position.

14. The nozzle of claim 11 wherein there are provided closure means for blocking said hollow tines when in the retracted position for substantially preventing flow of air through said tines.

15. The nozzle of claim 1 wherein chamber means are provided on said body adjacent said rake for receiving said rake when in said retracted position.

16. The nozzle of claim 15 wherein said chamber means comprises wall sections located at said tines for blocking air flow therethrough when the rake is in said retracted position.

17. The nozzle of claim 11 wherein the individual tines of said rake comprise side walls substantially parallel to each other and to the direction of movement of the nozzle with the bottom ends of these walls extending beyond the lower end of the respective said tubular portion.

18. The nozzle of claim 11 wherein said hollow body is provided with a fabric agitating member adjacent to said body opening for loosening dirt in the fabric when said nozzle is operated with the rake retracted.

19. The nozzle of claim 18 wherein said member comprises a brush.

20. The nozzle of claim 18 wherein said member comprises a synthetic short pile fabric of oriented semi-rigid fibers angled toward said opening and positioned for contact with the rug being cleaned when the rake is in said retracted position.

21. The nozzle of claim 20 wherein said fabric is mounted on said rake.

22. A vacuum cleaner nozzle apparatus movable over a deep pile rug and the like during cleaning, comprising:

a body having a suction chamber portion adapted to be subjected to vacuum, and a suction inlet;

a retractable rake having an upper portion at said body and a lower portion comprising a plurality of extended tines for combing said rug;

hinged attaching means for attaching the rake to said body for arcuate movement between an extended operative position and a retracted inoperative position; and retaining means for retaining said rake in said retracted position.

23. The apparatus of claim 22 wherein said retaining means comprises yieldable engaged members on said body and said rake that are in engagement when said rake is in the retracted position to maintain the retracted position and with means for forcibly displacing the retracted rake toward the extended position thereby displacing said members from their engagement.

24. The apparatus of claim 23 wherein said displacing means comprises a rotatable cam member on said nozzle body rotatable to urge said rake from said retracted position.

25. A vacuum cleaner nozzle for use in cleaning a rug, comprising:

a body defining a suction inlet opening;

a rake having tines, said rake being mounted to said body adjacent said suction inlet to be swingable as an incident of movement of the nozzle over the rug in a first direction to an extended position wherein said rake tines extend downwardly from said body to space said body opening substantially above the lower end of the tines in a high rug cleaning disposition, and to a retracted position as an incident of movement of the nozzle over the rug in an opposite direction wherein said rake tines extend laterally subjacent said body to permit the suction inlet opening to be disposed in a low rug cleaning disposition; and means for selectively retaining said rake in a retracted disposition irrespective of the direction of movement of the nozzle over the rug.

26. The vacuum cleaner nozzle of claim 25 wherein said rake retaining means comprises releasably engaging shoulder means on said rake and said body.

27. The vacuum cleaner nozzle of claim 25 wherein said rake retaining means includes manually operable means for forcibly releasing the rake from the retained arrangement.

28. The vacuum cleaner nozzle of claim 25 wherein said rake retaining means comprises cooperating detent means on said rake and body.

29. The vacuum cleaner nozzle of claim 25 wherein said rake retaining means further defines means for selectively preventing movement of said rake to said retained retracted disposition.

30. A vacuum cleaner nozzle for use in cleaning a rug, comprising:

a body defining a suction inlet opening;

a rake having hollow tines, said rake being mounted to said body adjacent said suction inlet to be swingable as an incident of movement of the nozzle over the rug in a first direction to an extended position wherein said rake tines extend downwardly from said body to space said body opening substantially above the lower end of the tines in a high rug cleaning disposition, and to a retracted position as an incident of movement of the nozzle over the rug in an opposite direction wherein said rake tines extend laterally subjacent said body to permit the suction inlet opening to be disposed in a low rug cleaning disposition;

closure means integral with said rake closing said body suction inlet opening when the rake is in said extended position; and means defining a suction passage to said body from said hollow tines when the rake is in said extended position.

31. The vacuum cleaner nozzle of claim 30 wherein said closure means comprises a portion of the rake extending oppositely of said tines.

32. The vacuum cleaner nozzle of claim 30 further including means for selectively retaining said rake in a retracted disposition irrespective of the direction of movement of the nozzle over the rug.

33. The vacuum cleaner nozzle of claim 9 wherein said tines are hollow and define a suction passage from the lower end of the tines to said body when the rake is in the extended position.

* * * * *

UNITED STATES PATENT OFFICE
CERTIFICATE OF CORRECTION

PATENT NO. : 3,894,308
DATED : July 15, 1975
INVENTOR(S) : KEITH E. CARR

It is certified that error appears in the above-identified patent and that said Letters Patent are hereby corrected as shown below:

Claim 15, line 49, after "claim" delete "1" and substitute therefor --11--.

Signed and Sealed this third Day of February 1976

[SEAL]

Attest:

RUTH C. MASON
Attesting Officer

C. MARSHALL DANN
Commissioner of Patents and Trademarks